US012156624B2

(12) United States Patent
Lyon

(10) Patent No.: US 12,156,624 B2
(45) Date of Patent: Dec. 3, 2024

(54) DYNAMIC FLUID HEATER AND WASHING APPLIANCE

(71) Applicant: Heatworks Technologies, Inc., Sullivan's Island, SC (US)

(72) Inventor: Gregory S. Lyon, Mamaroneck, NY (US)

(73) Assignee: OhmIQ, Inc., North Charleston, SC (US)

( * ) Notice: Subject to any disclaimer, the term of this patent is extended or adjusted under 35 U.S.C. 154(b) by 0 days.

(21) Appl. No.: 17/679,579

(22) Filed: Feb. 24, 2022

(65) Prior Publication Data

US 2022/0265117 A1 Aug. 25, 2022

Related U.S. Application Data

(60) Provisional application No. 63/152,906, filed on Feb. 24, 2021.

(51) Int. Cl.
*A47L 15/00* (2006.01)
*A47L 15/42* (2006.01)
(Continued)

(52) U.S. Cl.
CPC ....... *A47L 15/4285* (2013.01); *A47L 15/0089* (2013.01); *A47L 15/4214* (2013.01); (Continued)

(58) Field of Classification Search
None
See application file for complete search history.

(56) References Cited

U.S. PATENT DOCUMENTS 2,783,355 A 2/1957 Vassiliev
3,909,588 A 9/1975 Walker et al.
(Continued)

FOREIGN PATENT DOCUMENTS

AU 2013200499 A1 2/2014
CN 2585119 Y 11/2003
(Continued)

OTHER PUBLICATIONS

International Search Report and Written Opinion issued in Appln. No. PCT/US2022/017676 mailed Jun. 7, 2022 (19 pages).
"Inventorship Information" dated Jul. 2, 2024. 5 pgs.

*Primary Examiner* — Levon J Shahinian
(74) *Attorney, Agent, or Firm* — Lerner David LLP

(57) ABSTRACT

A heating system for heating a target fluid may include an intermediate liquid circulation path for holding an intermediate liquid and a target fluid flow path for conveying the target fluid, where the target fluid flow path and the circulation path are separate from one another but thermally communicate with one another via a heat exchanger. The intermediate liquid may be heated by a heater and circulated in the intermediate liquid circulation path by a pump. A ratio of the maximum heat output of the heater to the volume of the intermediate liquid circulation path may be at least about 5 Watts/$cm^3$. The thermal mass of the intermediate liquid may be 0.3 times the thermal mass of the target fluid or less. The heating system may be utilized in a washing appliance such as a dishwasher, where the target fluid is the wash water used in such appliance.

20 Claims, 8 Drawing Sheets

(51) Int. Cl.

| | |
|---|---|
| ***A47L 15/48*** | (2006.01) |
| ***D06F 39/04*** | (2006.01) |
| ***F24H 1/12*** | (2022.01) |
| ***H05B 1/02*** | (2006.01) |
| ***H05B 3/00*** | (2006.01) |

(52) U.S. Cl.

CPC ....... *A47L 15/4219* (2013.01); *A47L 15/4291* (2013.01); *A47L 15/48* (2013.01); *D06F 39/04* (2013.01); *F24H 1/121* (2013.01); *H05B 1/0244* (2013.01); *H05B 3/0009* (2013.01)

(56) References Cited

U.S. PATENT DOCUMENTS

| | | | |
|---|---|---|---|
| 4,029,937 | A | 6/1977 | Russell |
| 4,418,269 | A | 11/1983 | Eaton-Williams |
| 6,522,834 | B1 | 2/2003 | Herrick et al. |
| 7,817,906 | B2 | 10/2010 | Callahan et al. |
| 9,423,151 | B2 | 8/2016 | Kacar et al. |
| 11,510,287 | B2 | 11/2022 | Catelli et al. |
| 11,573,031 | B2 | 2/2023 | Nolte et al. |
| 2010/0074602 | A1 | 3/2010 | Israelsohn et al. |
| 2010/0282440 | A1 | 11/2010 | Trihey et al. |
| 2010/0322605 | A1 | 12/2010 | van Aken et al. |
| 2013/0129327 | A1 | 5/2013 | Israelsohn et al. |
| 2013/0152422 | A1* | 6/2013 | Chen ....................... D06F 25/00 34/427 |
| 2014/0233926 | A1 | 8/2014 | Van Aken et al. |
| 2014/0321836 | A1* | 10/2014 | Kacar ...................... H05B 3/60 392/316 |
| 2016/0081528 | A1 | 3/2016 | Anim-Mensah et al. |
| 2019/0271487 | A1 | 9/2019 | Callahan et al. |
| 2020/0214530 | A1 | 7/2020 | Callahan et al. |
| 2020/0374984 | A1 | 11/2020 | Catelli et al. |
| 2021/0153302 | A1 | 5/2021 | Wieckowski et al. |

FOREIGN PATENT DOCUMENTS

| | | | |
|---|---|---|---|
| CN | 206609136 | U | 11/2017 |
| CN | 111110155 | A | 5/2020 |
| DE | 102010029873 | A1 | 12/2011 |
| EP | 2177659 | A1 | 4/2010 |
| KR | 19990024192 | A | 3/1999 |
| KR | 101812263 | B1 | 12/2017 |
| WO | 2020142411 | A1 | 7/2020 |
| WO | 2021102141 | A1 | 5/2021 |

* cited by examiner

DYNAMIC FLUID HEATER AND WASHING APPLIANCE

CROSS-REFERENCE TO RELATED APPLICATIONS

This application claims the benefit of the filing date of U.S. Provisional Patent Application No. 63/152,906, filed on Feb. 24, 2021, the disclosure of which is hereby incorporated herein by reference.

BACKGROUND OF THE INVENTION

The present invention relates to fluid heaters and to washing appliances such as dishwashers incorporating the same.

A heater for use in a dishwasher, particularly a portable dishwasher, presents a particularly challenging problem. A dishwasher typically uses wash water at a temperature above the temperature of domestic hot water. Because a dishwasher desirably does not dissipate power while it is not in use, it cannot maintain a reservoir of heated water at the desired wash temperature, but instead must quickly heat a charge of wash water at the beginning of the wash cycle. The heater desirably is capable of heating a charge of wash water rapidly from a cold start when power is first supplied to the heater and maintaining the wash water at a desired high temperature during operation. For example, in one portable dishwasher design, the heater desirably heats a charge of 1.5 liters of water by 36° C. within 5 minutes, more desirably within 3 minutes, after power is applied. The wash water typically starts as potable water, but becomes contaminated with electrolytes from washing soap and food residues as the wash cycle progresses. Thus, the electrical conductivity of the wash liquid varies over a very wide range. Moreover, as the cycle progresses, the wash water can be contaminated with particulate matter which can foul the heater and with substances which can form deposits on elements of the heater, particularly when overheated. Also, a heater for a portable dishwasher desirably is compact, relatively inexpensive and durable.

Conventional electrical resistance heaters for heating liquids incorporate a solid heating element in contact with the liquid to be heated. The heating element typically includes an electrical resistance element surrounded by an electrically insulating material to keep the resistance element electrically isolated from the liquid, and may include a protective casing around the insulation. The rate at which a liquid can be heated by a resistance heating element is limited by the maximum temperature allowable at the surface of the element. High surface temperatures can promote localized boiling of the liquid, which reduces the rate of heat transfer from the heating element to the liquid. High surface temperatures can also promote undesirable reactions in the liquid. For example, when heating tap water, high surface temperatures promote scaling, i.e., deposition of a contaminant film on the surface of the heating element. These drawbacks are exacerbated by non-uniformities in the surface temperature of the heating element due to non-uniformities in structure of the heating element and in the liquid flow around the heating element. Moreover, electrical resistance heating elements have significant mass and heat capacity. When power is first applied to a cold heating element, its surface temperature rises slowly. Until the heating element reaches the desired surface temperature, the element heats the liquid slowly, if at all.

Despite these drawbacks, resistance heaters can be applied successfully in applications where the heater operates under steady-state or slowly changing conditions as, for example in tank-type water heaters, where the heater maintains a tank full of water at a constant desired temperature. In CN 2585119 Y and in KR 101812263 B1, one variant of a tank-type water heater maintains a large tank full of an intermediate liquid at a desired temperature using an electrical resistance heater immersed in the intermediate liquid. A coil of pipe is immersed in the intermediate liquid in the tank and the water to be heated is directed through the coil, so that the water is heated by heat transfer from the intermediate liquid. This arrangement is said to protect the resistance heater from scaling. EP 2177659 B1 uses a gas or electrical resistance heater to maintain an intermediate liquid at an elevated temperature. The intermediate liquid is circulated inside a rotating heat exchange tube disposed in a water supply tank for an industrial textile laundry.

An "ohmic" heater includes plural electrodes exposed to the target liquid. An electrical power supply is arranged to apply a voltage between different ones of the electrodes that an electrical current passes through the target liquid and heats it. Because the heat is generated within the target liquid, the electrodes typically remain at or near the average temperature of the target liquid, which alleviates or entirely eliminates scaling. Moreover, ohmic heaters can heat the target liquid rapidly. However, the power dissipated in an ohmic heater varies with the electrical conductivity of the target liquid as well as with the length of the current path through the target liquid between energized electrodes and the configuration of the electrodes. To provide a desired heating rate, the electrical circuit may vary the voltage applied to the electrodes, may select different combinations of electrodes as energized electrodes, or may use both approaches. U.S. Pat. No. 7,817,906; and United States Patent Application Publication 20190271487, the disclosures of which are hereby incorporated by reference teach ohmic heaters which can successfully provide a range of heating rates despite the wide variation in conductivity encountered in typical domestic potable water supplies. However, the electrical conductivity of the wash water in a dishwasher varies over a much wider range of conductivities due to loading with electrolytes from detergents and food residues. Although ohmic heaters capable of dealing with this problem have been developed, as set forth, for example, in Published International Application 2021/102141, the disclosure of which is incorporated by reference herein, still further improvement would be desirable.

DETAILED DESCRIPTION

Figure 1:
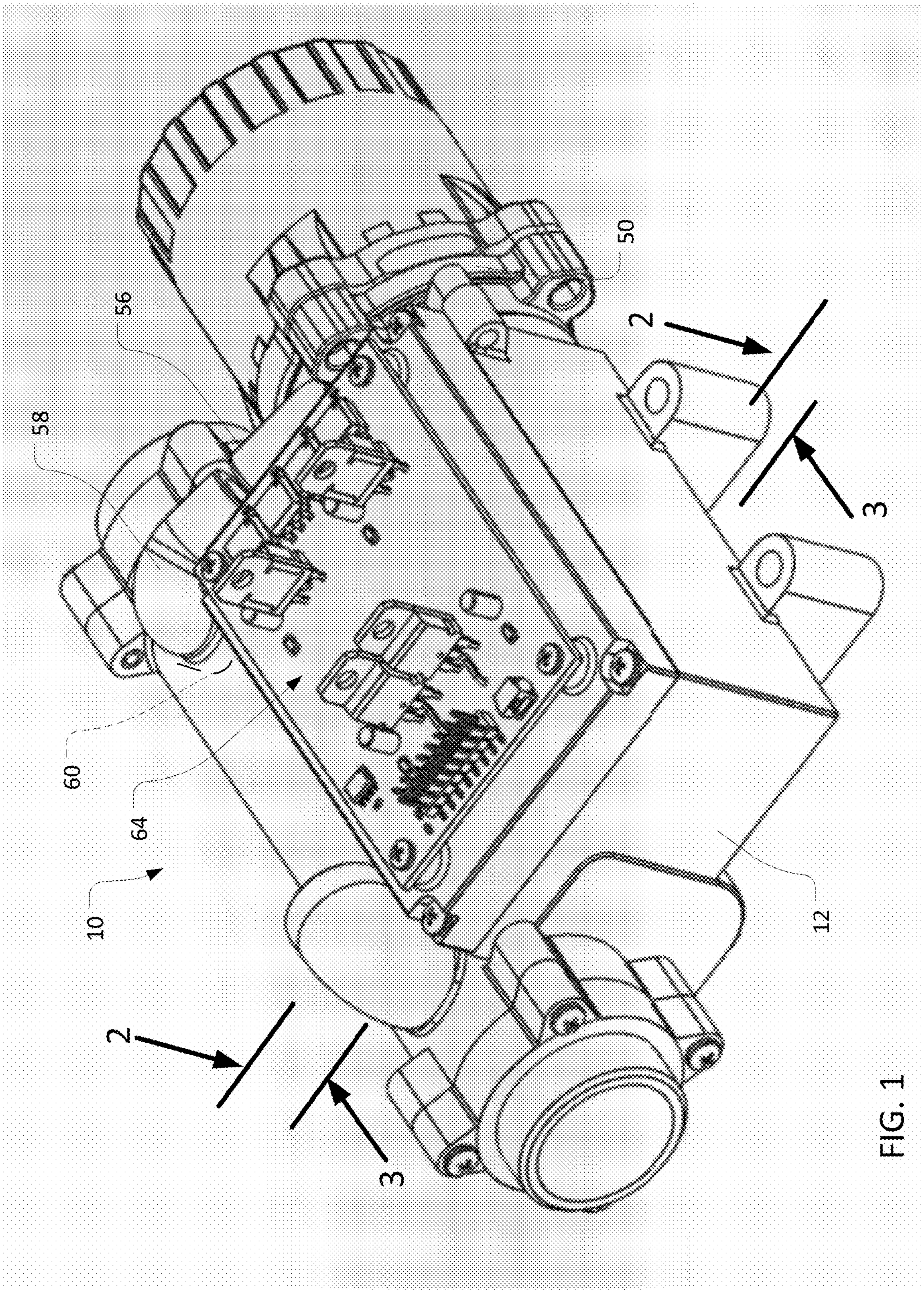
FIG. 1 is a perspective view of a heating system according to one embodiment of the invention.

A heating system 10 according to one embodiment has a structure including a casing 12 which defines a hollow heat exchanger shell 14 (FIG. 2) in the form of an elongated tube having an axis 16. Casing 12 also defines a generally rectangular heater chamber 18. A pair of end plates 20 and 22 are mounted within shell 14 at opposite ends of the shell. The end plates are sealingly connected to the wall of casing 10 bounding the shell, so that the end plates and the casing cooperatively define an enclosed cylindrical interior space within the shell. Each end plate has three holes 24 extending through it at locations equally spaced around axis 16 of the shell. Three tubes 26 (FIGS. 2 and 3) extend between holes 24 in the end plates 26. Tubes 26 desirably are formed from a metal or other material having good thermal conductivity. At each end plate, the periphery of each tube is sealed to the end plate, so that the spaces within the tubes do not communicate with the interior space of shell 14. Two tubular end fittings 28 and 30 are mounted to the casing just outside of the end plates 20 and 22, so that the interior of each fitting communicates with the spaces within tubes 26. The end fittings 28 and 30 and tubes 26 thus define a continuous flow path for a target fluid to pass through heating system 10.

Figure 2:
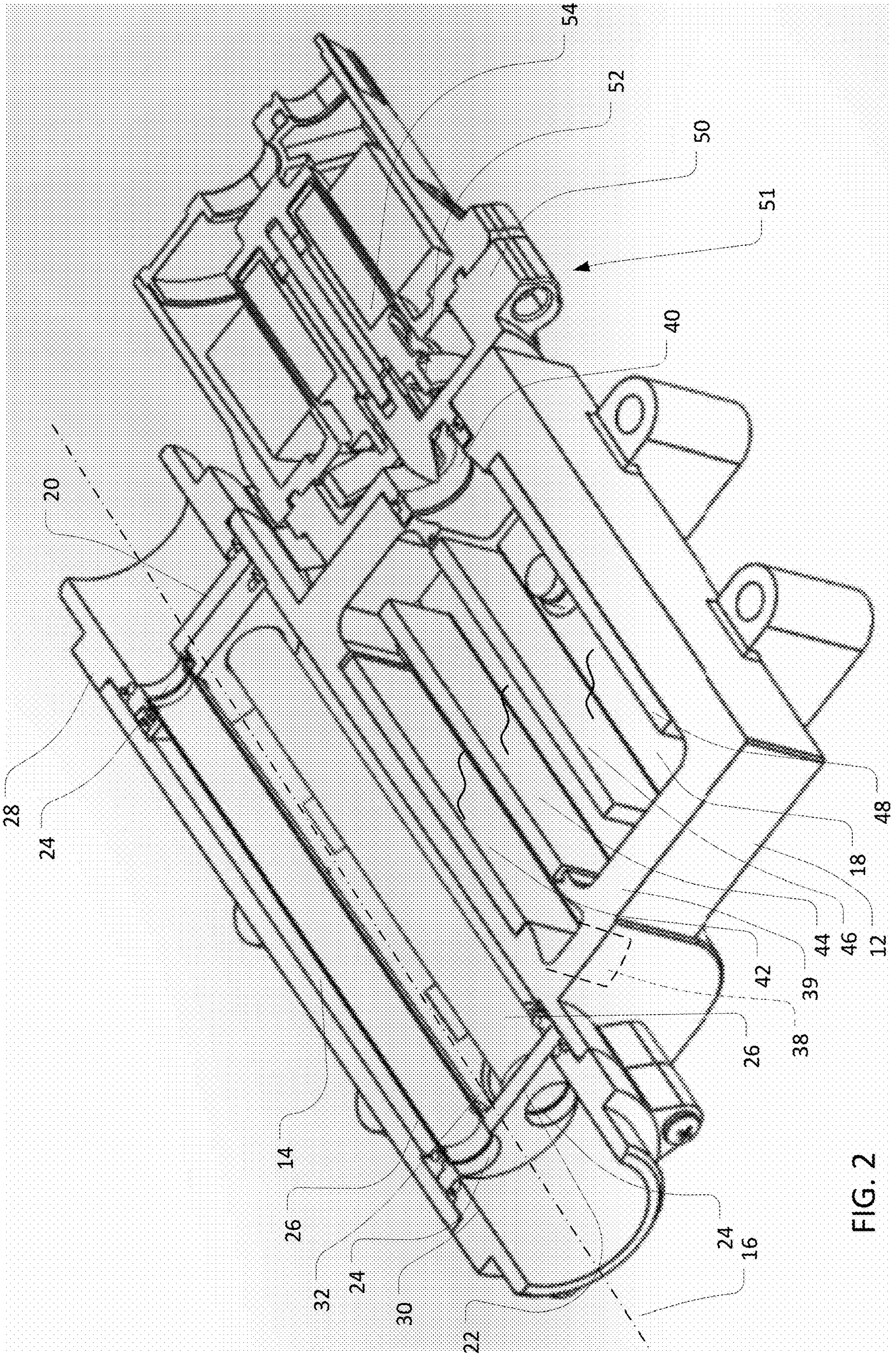
FIG. 2 is a perspective, partially sectional view taken along line 2-2 in FIG. 1.
Figure 3:
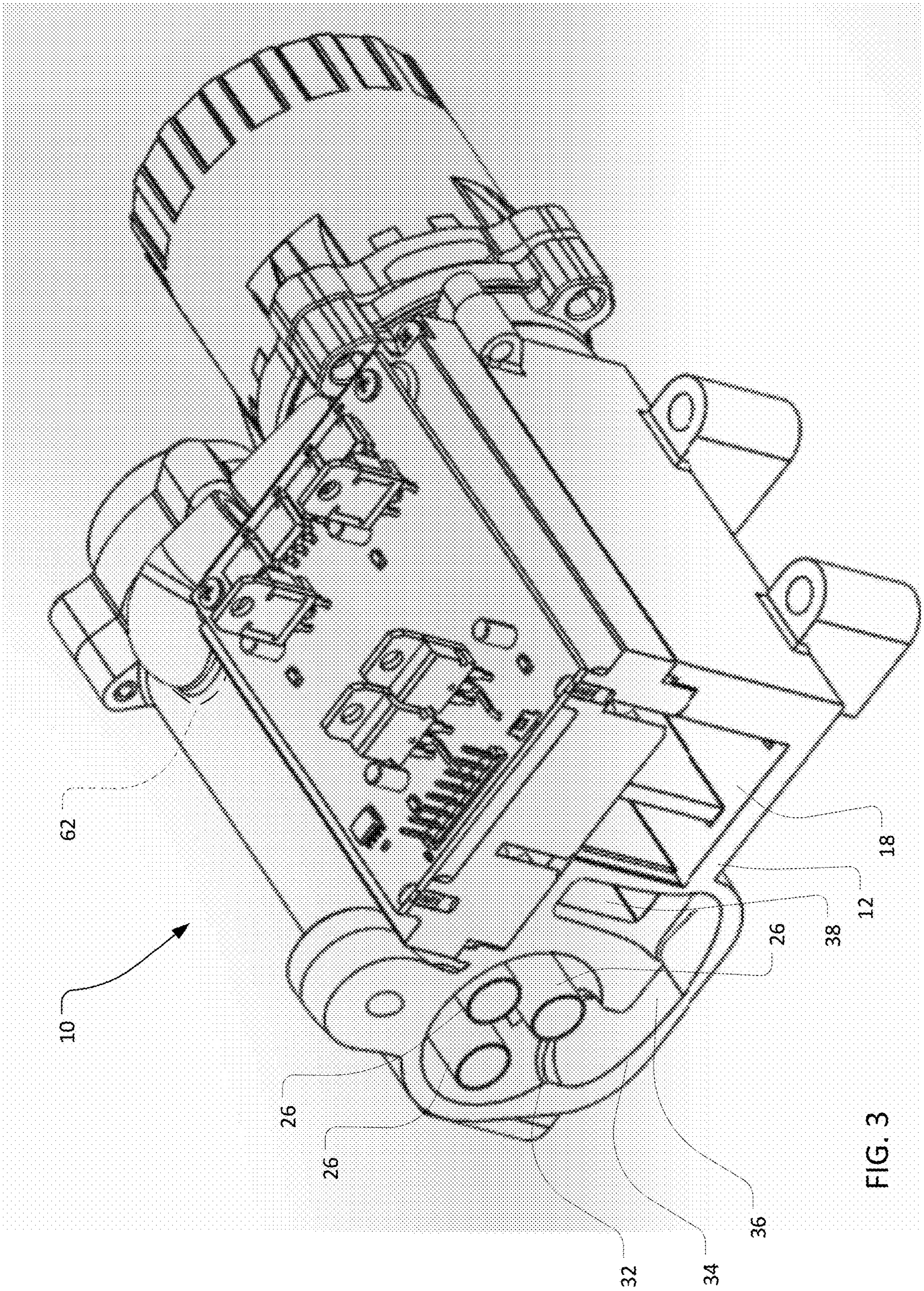
FIG. 3 is a perspective, partially sectional view taken along line 3-3 in FIG. 1.

An outlet port 32 communicates with the interior space of shell 14 adjacent end plate 32. As best seen in FIG. 3, the structure further includes a fitting 34 defining a passageway 36 extending from port 34 to an inlet opening 38 of the heater chamber 18. As best seen in FIG. 2, inlet opening 38 extends through in an end wall 39 of heater chamber 18 adjacent one corner of the heater chamber. An outlet opening 40 (FIG. 2) communicates with the heater chamber 18 at the corner diagonally opposite from inlet opening 38. Four generally flat, plate-like electrodes 42, 44, 46 and 48 are disposed within heater chamber 18. The electrodes are formed from an electrically conductive material such as graphite, and are arranged with the major surfaces of the electrodes confronting one another across spaces between the electrodes. Electrodes 42 and 48 are disposed on opposite sides of the heating chamber, with electrodes 42 and 44 between electrodes 42 and 48. The electrodes and the heating chamber are arranged to direct liquid passing through the heater chamber from the inlet opening 38 to the outlet opening 40 along a serpentine path, first through the space between electrodes 42 and 44, then around the end of electrode 44 remote from end wall 39, then through the space between electrodes 44 and 46 and around the end of electrode 46 adjacent end wall 39, and finally through the space between electrodes 46 and 48 to outlet opening 40.

The structure also includes a pump 51. Pump 51 includes a hollow pump housing 50 (FIG. 2). Pump housing 50 has an inlet opening aligned with the outlet opening 40 of the heater chamber. A pump rotor 52 is disposed in the pump housing and is linked to an electric motor 54. Pump housing 50 has an outlet port (not shown) at its periphery. The outlet port communicates with a pump outlet pipe 56 (FIG. 1) which in turn is connected via a fitting 58 to an inlet port 60. Inlet port 60 communicates with the interior volume of shell 14 at a location between end plates 20 and 22 but adjacent end plate 20 (FIG. 2). Thus, the inlet port 60 is near the opposite end of shell 14 from outlet port 32. Inlet port 62 also is disposed on the opposite side of the axis 16 of the shell. Thus, liquid passing within the shell, from the inlet port 60 to outlet port 32 will pass around tubes 26.

The structure thus defines a closed loop for circulation of a liquid, referred to herein as the "intermediate" liquid. This loop includes the spaces within shell 14 (outside of tubes 26), passageway 36 (FIG. 3), heater chamber 18, pump housing 50 and outlet pipe 56. The intermediate fluid desirably is a liquid having known electrical conductivity properties as, for example, an aqueous liquid having known concentrations of electrolytes. The intermediate liquid may be provided in the loop when the heating system is manufactured, or may be filled into the circulation path just before the system is placed into operation. Desirably, the intermediate liquid circulation path is sealed once the intermediate liquid is placed within the loop. Preferably, the structure does not include a vent or overflow opening allowing communication between the intermediate liquid circulation path and the exterior after the intermediate liquid has been installed. The structure may include a flexible wall (not shown) which allows the volume of the intermediate liquid circulation path to expand sufficiently to compensate for thermal expansion of the intermediate liquid over the expected operating range. For example, a rolling diaphragm may be utilized to allow for expansion of the intermediate liquid while also applying pressure to the intermediate liquid. Such a rolling diaphragm may include a flexible membrane to which a piston transmits pressure due to the force applied by one or more coil compression springs. Beneficially, the spring(s) may be designed to follow the saturation curve of the intermediate liquid, so as to minimize cavitation in the liquid. Additionally, by applying pressure to the intermediate liquid, the rolling diaphragm may allow the intermediate liquid (e.g., water) to be heated above the boiling point. That may be particularly important in applications in which relatively high temperatures are to be applied to the target fluid. For example, utilizing the heating system in a beverage dispensing device for hot beverages (e.g., coffee) could involve heating the target fluid to 92-94° C.

Shell 14 and tubes 26 together form a heat exchanger. Desirably, the intermediate liquid forms a permanent part of the heating system. That is, the intermediate liquid is not consumed or replaced during normal operation of the system, although it may be replaced during repair of the system. The target fluid in tubes 26 is in thermal communication with the intermediate fluid in shell 14. Stated another way, shell 14 constitutes a heat exchange portion of the intermediate fluid loop, whereas tubes 26 constitute a heat exchange portion of the target fluid path; these heat exchange portions are in thermal communication with one another.

Electrodes 42-48 (FIG. 2) form part of an ohmic heater. The ohmic heater further includes an electrical circuit 64 (FIG. 1). The electrical circuit includes power switches such as semiconductor switches adapted to connect different ones of the individual electrodes to different poles of a power supply such as a conventional AC utility power supply (not shown) so as to impose different electrical potentials on different ones of the electrodes. When the potentials are applied, electrical current passes through the intermediate liquid in the spaces between the electrodes and heats the liquid. The heating rate varies with the square of the current, and the current is inverse to the electrical resistance of the liquid between the poles. The electrical resistance between any two electrodes is proportional to the length of the current path through the space or spaces between electrodes connected to the poles of the power supply, and also depends on the size and shape of the electrodes. In this embodiment, the electrodes are flat plates of equal size but are unequally spaced from one another. The distance between electrodes 42 and 44 is less than the distance between electrodes 44 and 46, which in turn is less than the distance between electrodes 46 and 48. Moreover, the circuit can connect the electrodes to the power supply so that one or more electrodes physically disposed between the connected electrodes are left unconnected to the power supply. For example, by connecting electrode 42 to one pole of the power supply and electrode 48 to the opposite pole while leaving electrodes 44 and 46 disconnected from the power supply, the circuit establishes a single, very long current path extending through the liquid in all of the spaces and through the disconnected electrodes 44 and 46. The circuit desirably includes one or more sensors for monitoring a condition of the system such as the temperature of the intermediate liquid and selecting a current path which provides a desired heating rate. Various arrangements of electrodes and systems for controlling the heating rate supplied by an ohmic heater are set forth in the US and PCT documents mentioned above; these features may be used in the ohmic heater.

The current flowing along a given current path varies directly with the electrical conductivity of the liquid disposed between the electrodes. Ohmic heaters typically include numerous electrodes and numerous switches to provide a wide range of current paths necessary to allow selection of a desired heating rate even when the conductivity of the liquid being heat varies dramatically. In the system of FIGS. 1-3, however, the intermediate liquid is of known composition. Although its conductivity will vary with temperature, the range of conductivity of the intermediate liquid is small in comparison to the range of conductivity encountered in a heater designed to directly heat potable water flowing between the electrodes, and is orders of magnitude smaller than the range of conductivity encountered with wash water in a dishwasher. This greatly simplifies the design of the ohmic heater, so that the heater can function satisfactorily with only a small number of electrodes and spaces, which makes the heater compact and minimizes the volume of the heating chamber. Because the ohmic heater and other elements of the intermediate liquid circulation path do not come in contact with target fluid, they are protected from contamination and scaling. Moreover, because the intermediate liquid is a permanent part of the heating system, the system can be adapted to operate using different utility power supply voltages as, for example, 120 volts as commonly supplied in the North America or 230 volts as commonly supplied in Europe and China, simply by filling the circulation path with different intermediate liquids when the system is assembled for different markets. A liquid of higher conductivity is used for a market with lower utility supply voltage. There is no need to modify the circuitry or the configuration of electrodes.

The entire intermediate liquid circulation path desirably is compact so as to limit the volume of intermediate liquid required to fill the circulation path. This in turn limits the mass of intermediate liquid and hence limits the thermal mass of the intermediate liquid and the thermal mass of the heating system as a whole. As used in this disclosure with reference to an element or an assemblage of elements, the term "thermal mass" is the amount of energy required to heat the element or assemblage by 1° C. For an element of uniform composition, such as the intermediate liquid, the thermal mass is simply the product of the specific heat of the material constituting the element multiplied by the mass of the element. For an assemblage of elements such as the heating system as a whole, the thermal mass is the sum of the thermal masses of the individual elements. As further discussed below, limiting the thermal mass of the heater improves the dynamic response of the heater and reduces the time necessary for the heater to produce heated target fluid at a desired temperature when starting from an initial "cold start" condition in which the intermediate liquid is at a temperature below the desired temperature of the target liquid. Typically, the thermal mass of the intermediate liquid constitutes a substantial part of the thermal mass of those parts of the heating system as a whole which are in contact with the intermediate liquid, and most typically the majority of the thermal mass. In one example of the heating system depicted in FIGS. 1-3, the volume of the intermediate liquid circulation path is 130 $cm^3$, and the mass of the intermediate liquid (water with a small amount of electrolytes) is 0.13 kg. The effect of the thermal mass on the dynamic response of the heating system can be characterized by the ratio of the maximum heating rate of the heater to the thermal mass of the intermediate liquid, which is referred to herein as the "adiabatic intermediate liquid heating rate" of the heating system. It is the rate at which the heater could heat the intermediate liquid absent any heat transfer from the intermediate liquid to other components of the heating system or to a target fluid. Desirably, this ratio is at least about 0.5° C./sec, more desirably at least 1, and still more desirably at least 1.5. In the same example discussed above, the thermal mass of the intermediate liquid is 550 Joules/° C., whereas the maximum heating rate of the Ohmic heater is 1500 Watts, i.e., 1500 Joules/sec. Therefore, the adiabatic intermediate liquid heating rate is 2.75° C./sec. The components of the heating system in contact with the intermediate liquid also have some thermal mass, so that the actual heating rate of the intermediate liquid will be less than the adiabatic heating rate even when the heating system is operated without a target liquid. The actual heating rate of the intermediate liquid measured with the heat exchange portion of the target fluid path blocked off and filled with a gas such as air having negligible thermal mass is referred to herein as the "no load intermediate liquid heating rate" of the heating system. The no load intermediate liquid heating rate desirably is at least 1.5° C./sec, more desirably at least 2° C./sec. Another meaningful parameter is the ratio of the maximum heating rate of the ohmic heater to the volume of the intermediate liquid circulation path to, i.e., the volume occupied by the intermediate liquid when the intermediate liquid is installed. This ratio desirably is at least 5 Watts/$cm^3$, more desirably at least 7, and still more desirably at least 10.

The use of an ohmic heater significantly simplifies the design of the structure with a sealed intermediate liquid circulation path. Because the ohmic heater generates heat in the intermediate liquid, rather than transferring heat to the liquid, it does not cause localized boiling of the intermediate liquid at surface of the heater. Therefore, pressure within the intermediate liquid circulation path can be controlled safely by monitoring and controlling the average temperature of the intermediate liquid. By contrast, a solid resistance heater can cause localized boiling of the liquid at the surface of the heating element even while the bulk temperature of the liquid is well below the boiling temperature of the liquid, so that a pressure relief valve typically must be incorporated in a vessel heated by a resistance heater.

Another factor which facilitates rapid heating of a target liquid is the low holdup of the target liquid within the heat exchange portion of the target fluid path, i.e., within tubes 26 (FIGS. 2 and 3). Desirably, the internal volume of the heat exchange portion of the target fluid path is less than or equal to the entire volume of the intermediate liquid circulation path, and more preferably the internal volume of the heat exchange portion of the target fluid path is less than one half the entire volume of the intermediate liquid circulation path.

Pump 51 desirably is arranged to impel the intermediate liquid through shell 14 at a rapid rate, to provide turbulent flow of the intermediate liquid around tubes 26. This promotes rapid heat transfer between the intermediate liquid and the outer surfaces of the tubes. Moreover, the flowing intermediate liquid is continually mixed, which helps to suppress localized heating of the tube walls. Desirably, the target fluid also flows at a rate which assures turbulent flow within the tubes, to enhance heat transfer from the tube wall to the target fluid and further suppress localized heating of the tube walls.

A dishwasher 100 according to a further embodiment of the invention includes a housing 102 defining a hollow wash chamber 104 and space 106 for other components. The housing may include an openable door (not shown) or a removable portion (not shown) to allow access to the wash chamber. A rack 108 is disposed within the wash chamber for holding dishes D to be washed. Housing 102 has a wall 110 defining the floor of the wash chamber. An operational sump 112 and a waste water drain sump 114 are open to the wash chamber and extend downwardly from the floor of the wash chamber. The operational sump is connected to the inlet of a water pump 118. A fresh water reservoir 120 is connected to the inlet of pump 118 and to the operational sump via a fresh water control valve 122. The waste water drain sump is connected to a waste water reservoir 124 via a waste water control valve 127. The waste water reservoir is removably mounted in housing 102. The outlet of pump 118 is connected to a spray device 126 such as a rotatable arm with multiple openings. The spray device is adapted to spray water upwardly within the wash chamber through rack 108 so that the sprayed water impinges on dishes D. The foregoing features may be as described in the Published International Application WO 2020/142411, the disclosure of which is incorporated by reference herein.

Figure 4:
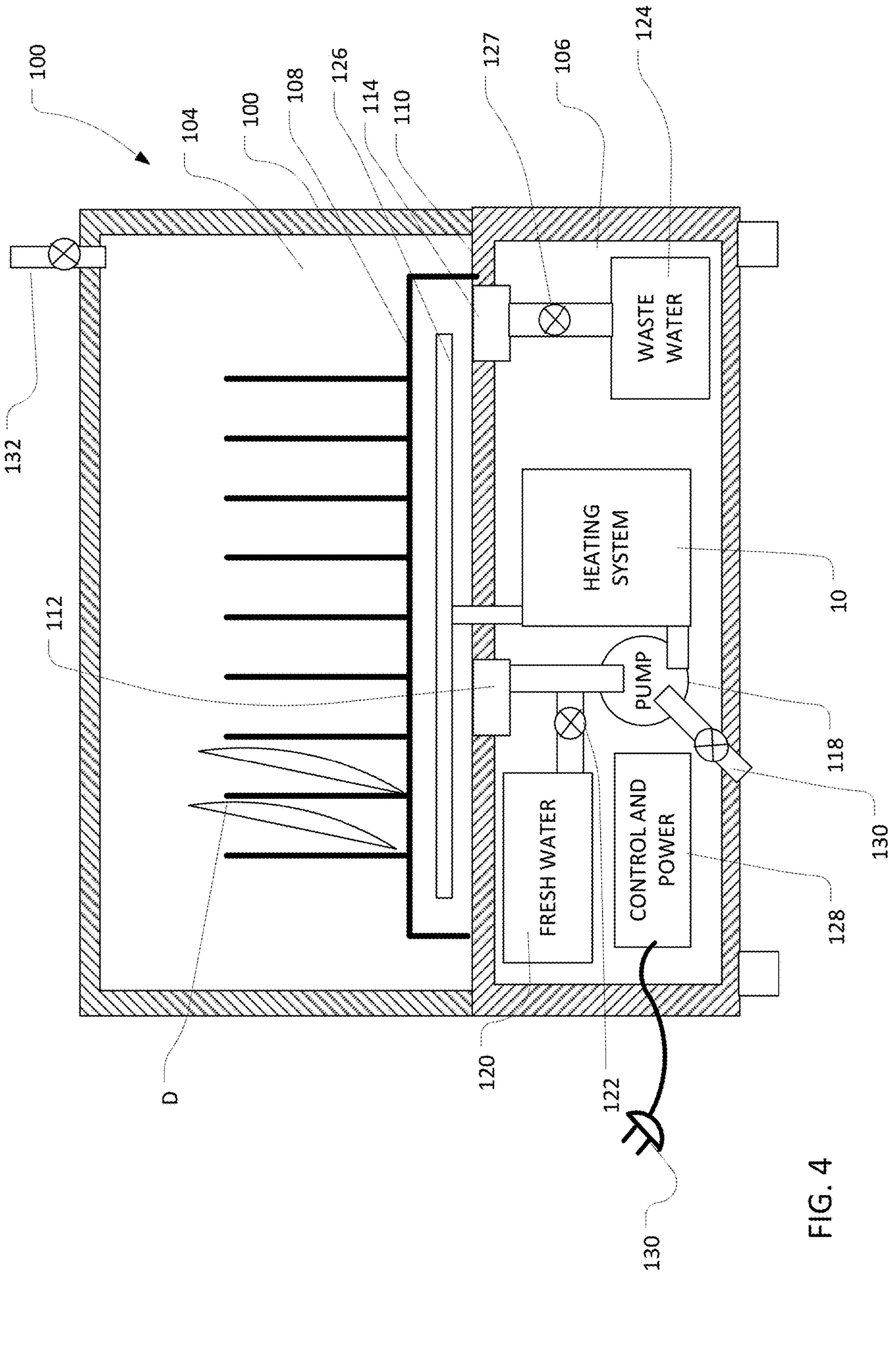
FIG. 4 is a schematic view of a dishwasher according to a further embodiment of the invention.

The dishwasher of FIG. 4 further includes a heating system 10 as described above with reference to FIGS. 1-3. The target fluid path of the heater is connected between the outlet of pump 118 and spray device 126. For example, the outlet of water pump 118 may be connected to fitting 30 (FIG. 2) whereas the spray device 126 may be connected to fitting 28. In this configuration, water impelled by pump 118 will pass through tubes 26 in a direction generally to the right as seen in FIG. 2, generally countercurrent to the flow of the intermediate liquid within shell 14.

The dishwasher also includes a power and control circuit 128 arranged to draw electric power from a utility circuit as, for example, through a plug 130 adapted to fit a standard utility power outlet. Circuit 128 is arranged to supply power to actuate the various elements of the dishwasher, and to control their operation to perform the functions discussed below.

In operation, the user places items to be washed onto rack 108 and pours a charge of water into the wash chamber. Fresh water control valve 122 is held open and waste water valve 127 is held closed at this time, so that the charge of water drains into the fresh water reservoir through sump 112 and fills the fresh water reservoir 120. Detergent is introduced into the wash chamber by the user or by a detergent dispenser (not shown) and the wash chamber is closed. The control circuit then actuates water pump 118 to draw water from the fresh water reservoir 120 and impel the water through the target fluid path of heating system 10 and through spray device 126 into the wash chamber until a predetermined first portion of the water charge has been drawn from reservoir 120, whereupon fresh water valve 122 is closed. The water pump continues in operation so that the water which has been drawn from the reservoir continually recirculates from the wash chamber and through the water pump and heating system.

The control circuit commands the ohmic heater in heating system 10 to supply heat at the maximum capacity of the heater to heat the intermediate liquid in heating system 10 so that the intermediate liquid heats the water. As discussed above, heating system 10 can heat the target fluid rapidly from a cold start. The low thermal mass of the heating system contributes to this capability. Even where the heating system is started at the same time as the water pump, any delay in heating caused by the thermal mass of the heating system is small. Desirably, the thermal mass of the intermediate liquid is small in comparison to the thermal mass of the target liquid to be heated. In a dishwasher, the thermal mass of the target liquid can be taken as the thermal mass of the charge of water used during a single cycle of operation of the dishwasher. In the portable dishwasher of FIG. 4, the charge of water consists of the amount of water filled into the fresh water reservoir 120, water pump 118 and into the target fluid path of heating system 10 when the user pours water into the dishwasher. Desirably, the ratio of the thermal mass of the intermediate liquid to thermal mass of the charge is 0.3 or less, desirably 0.2 or less, more preferably 0.1 or less. Stated another way, the thermal mass of the intermediate liquid adds only a relatively small portion of the combined thermal mass of the intermediate liquid and charge of water. As the total thermal mass to be heated during operation of the dishwasher also includes the thermal mass of the dishes disposed in the wash chamber, the rack which holds the dishes and the walls of the wash chamber itself, in addition to the charge of water, the thermal mass of the intermediate liquid constitutes an even smaller portion of the total thermal mass.

As the wash water approaches the desired temperature, the control system may command the heating system to reduce the rate at which heat is supplied to the intermediate liquid. Because the thermal mass of the intermediate liquid is small, the temperature of the intermediate liquid will decline rapidly due to continued heat transfer to the wash water. The control system may adjust the heating rate as needed to maintain the intermediate liquid at a temperature just slightly above the desired temperature of the wash water so as to supply heat to the wash water at a low rate and compensate for heat lost to the surroundings. Alternatively, the control system may simply command the heater, or the heating system as a whole, to turn off. The ability of the heater 10 to react quickly to changes in the desired heating rate of the target fluid offers a significant advantage.

The water pump 18 continues to recirculate the wash water through the spray device 26 and through the wash chamber for a time sufficient to wash the dishes D. Then, the control system commands waste water valve 127 to open so that the wash water drains through waste water sump 114 into the waste water reservoir 124. The wash water pump 118 continues to operate so as to bring any wash water which has drained into the operational sump 112 back up into the wash chamber where it will drain into the waste water sump 114 and into the waste water reservoir. This desirably continues until the operational sump and the pump have been substantially purged of wash water. The control system then closes waste water valve 127 and opens fresh water valve 122 so that the remaining water from fresh water reservoir is supplied as rinse water to wash water pump 118 and recirculated through spray device 126, through the wash chamber and through operational sump 112. During this step, the control system again commands the heating system to heat the circulating rinse water. Stated another way, the charge of water initially introduced into the dishwasher is heated in two portions, i.e., a first portion heated as wash water and a second portion heated as rinse water. After the dishes have been rinsed, the control system opens the waste water valve, so that the rinse water drains into waste water reservoir 124.

Optionally, after the rinse water has been drained, the control system may command water pump 118 to remain in operation so as to recirculate air in the wash chamber through heating system 10 and the spray device 126 and through the wash chamber so as to dry the dishes. The control system desirably commands the heating system to maintain the intermediate liquid at an elevated temperature and thus heat the circulating air to promote drying. In this regard, the ability of the heating system to heat essentially any fluid, whether or not the fluid is electrically conductive, provides a significant advantage. The dishwasher may include an air inlet 130 to admit air into the dishwasher and a moist air outlet 132 to discharge moist air from the dishwasher. Each of these may be equipped with valves which are kept closed during the wash and rinse operations and then opened. As depicted, the air inlet is arranged to supply fresh air directly to the inlet of the pump. In a further variant, the fresh air inlet may admit air to the wash chamber, desirably near the operational sump so that this air will be drawn into the pump. In this variant, fresh air is continually supplied during the drying operation and heated by heating system 10. In a further variant, a fan (not shown) separate from the water pump can be used to circulate air through the heating system and wash chamber.

In a further variant, in preparation for heating the wash water at the beginning of the cycle, the control circuit may actuate the heating system to begin heating the intermediate liquid before starting the water pump. To reduce the time consumed in the cycle of operations needed to wash the dishes, the control circuit may be arranged to start the heating system in response to an action which is expected to occur before the wash chamber is closed with the dishes and detergent inside, including one or more of the following: (i) insertion of plug 130 into a utility power outlet; (ii) opening or closing of the wash chamber; (iii) the beginning of filling the fresh water reservoir 120, detected by a fresh water level sensor (not shown) associated with the reservoir; or (iv) an input entered by the user to the control system indicating that the user is planning to start a wash cycle. Likewise, in preparation for heating the rinse water, the control system can restart the heating system or raise the heating rate of the ohmic heater before opening the fresh water valve to dispense the rinse water.

Numerous variations and combinations of the features discussed above can be used. For example, dishwasher discussed above may be a fixed dishwasher, having permanent connections to the plumbing and electrical utility system of a building or vehicle.

The heating system 10 discussed above can be varied. For example, the pump 51 used to circulate the intermediate liquid may be driven by a turbine exposed to the flow of the target fluid, rather than by an electric motor. Also, although the pump in the embodiments discussed above is a centrifugal pump, the word "pump" as used herein should be understood as encompassing any device which can impel motion of the intermediate liquid along the intermediate liquid flow path. Also, the pump need not incorporate a pump chamber separate from other components of the flow path.

Figure 5:
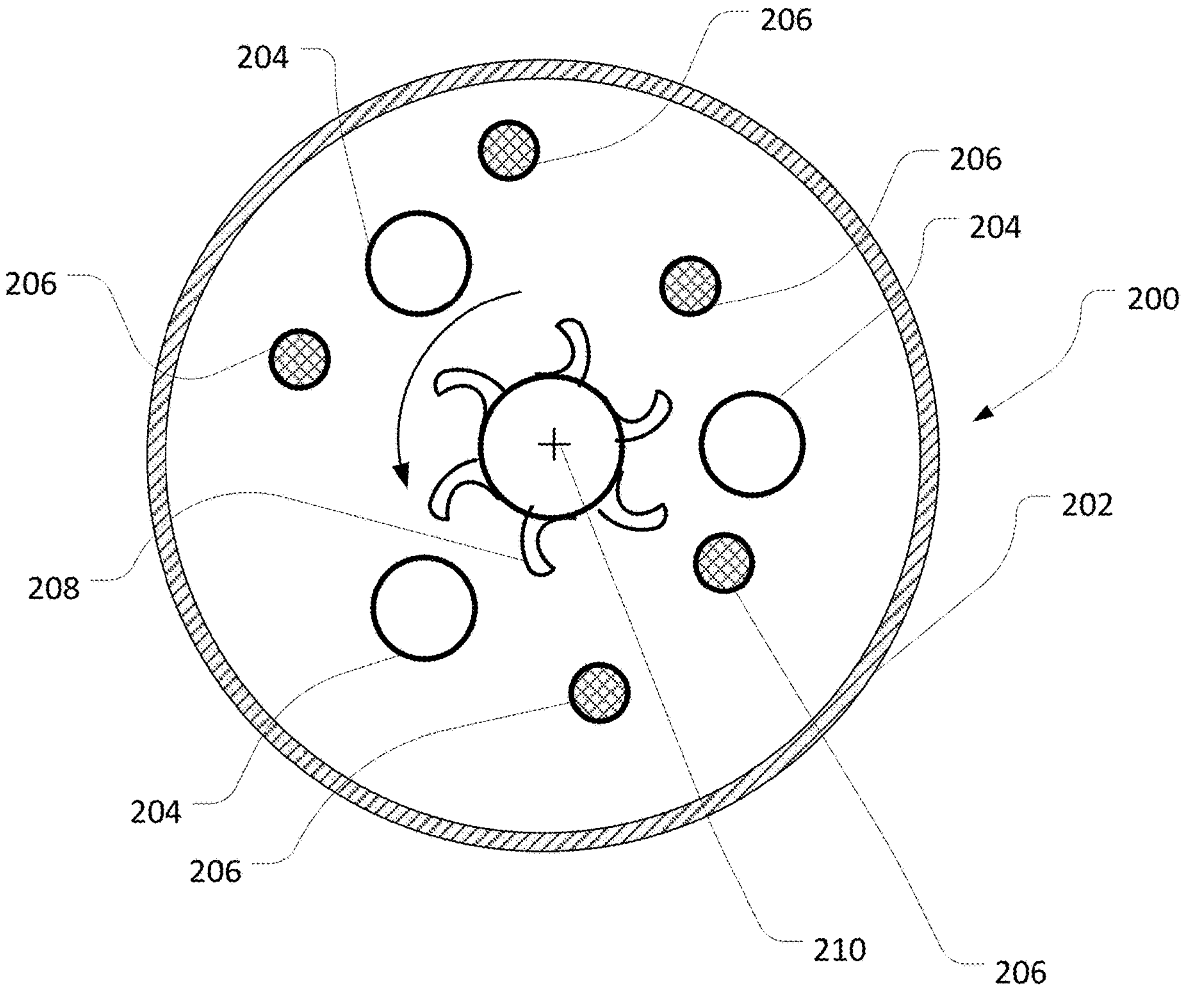
FIG. 5 is a diagrammatic sectional view depicting a heating system according to yet another embodiment of the invention.

The configuration of the heating system may be varied. For example, to further reduce the volume of the intermediate liquid flow path, the heater chamber 18 (FIG. 2) may be formed as a toroidal vessel wrapped around the shell 14. Indeed, it is not essential to provide a heater chamber separate from the shell. The electrodes of the ohmic heater may be placed within the shell. The pump impeller may be placed within the shell, so as to circulate the intermediate liquid within the shell. In such an embodiment, the heat exchange portion of the intermediate liquid flow path would include all or almost all of the volume of the shell. For example, as schematically depicted in FIG. 5, a heating system 200 according to a further embodiment of the invention includes a cylindrical shell 202 having tubes 204 disposed within it. The electrodes 206 of the ohmic heater are also disposed within the shell. In this embodiment, the electrodes are rod-like elements, and are interspersed with the tubes. An impeller 208 is also mounted within the shell. In this embodiment, the entire intermediate liquid circulation path is contained within the shell. The impeller drives the intermediate liquid in circulation around the axis 210 of the shell. In a further embodiment, one or more of the electrodes of the ohmic heater may serve as a portion of a flow path. For example, tubes 206 may serve as some or all of the electrodes of the ohmic heater.

In the embodiments discussed above with reference to FIGS. 1-3, the heat exchange portions of the flow path form a shell and tube heat exchanger, with the intermediate liquid in the shell and the target liquid in the tubes. This can be reversed, so that the target liquid is directed through the shell and the intermediate liquid is directed through the tubes. In this case, the electrodes of the ohmic heater can be disposed within the tubes. The number of tubes can be varied. In still other embodiments, other types of heat exchangers can be used, as, for example, a plate-type heat exchanger, with chambers separated by thermally conductive plates, or a tube-tube heat exchange, where a tube forming part of the target fluid flow path in disposed inside a tube forming part of the intermediate liquid flow path.

Figure 6:
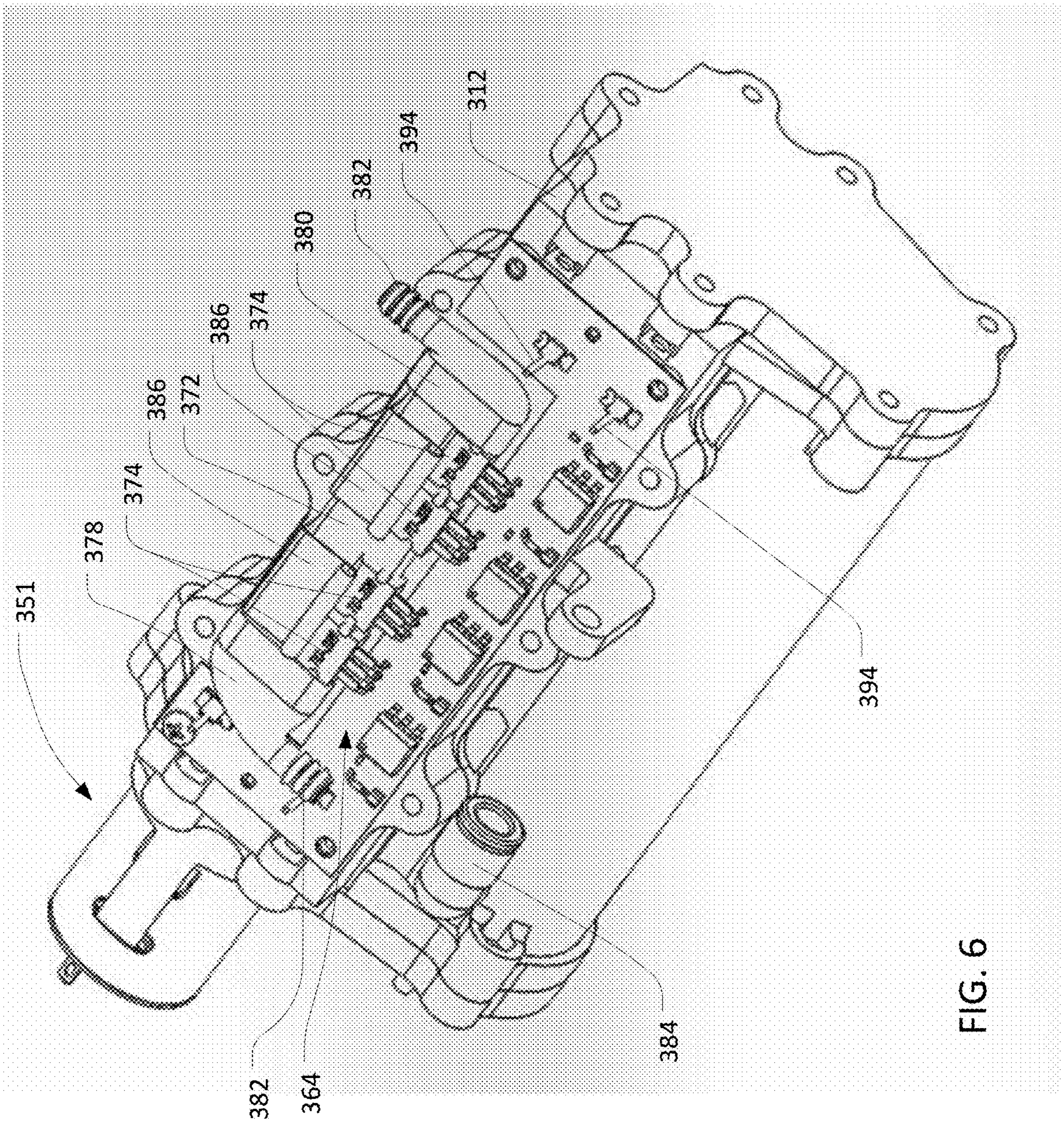
FIG. 6 is a perspective view of a heating system according to another embodiment of the invention.

In other embodiments of the heating system, cooling of portions of the electrical circuit 364 may be provided, as shown in FIG. 6. For example, a branch 370 may be added to the closed loop for the intermediate liquid. Such branch may pass in proximity of one or more components of the electrical circuit 364, where a heat sink 372 may be located to transfer heat from the electrical component(s) to the liquid in the branch 370. Such electrical components to be cooled may include triacs 374, which can get quite hot during operation (e.g., up to 150° C.). Although the intermediate liquid may be quite hot as well, it may not exceed about 105° C., even when using the heating system in a hot beverage dispensing device. Therefore, as the intermediate liquid has a lower temperature than the triacs 374 and a higher thermal conductivity than the surrounding air, in addition to the fact that the intermediate liquid is continuously flowing, the branch 370 may competently prevent the triacs 374 from becoming excessively hot.

Figure 7:
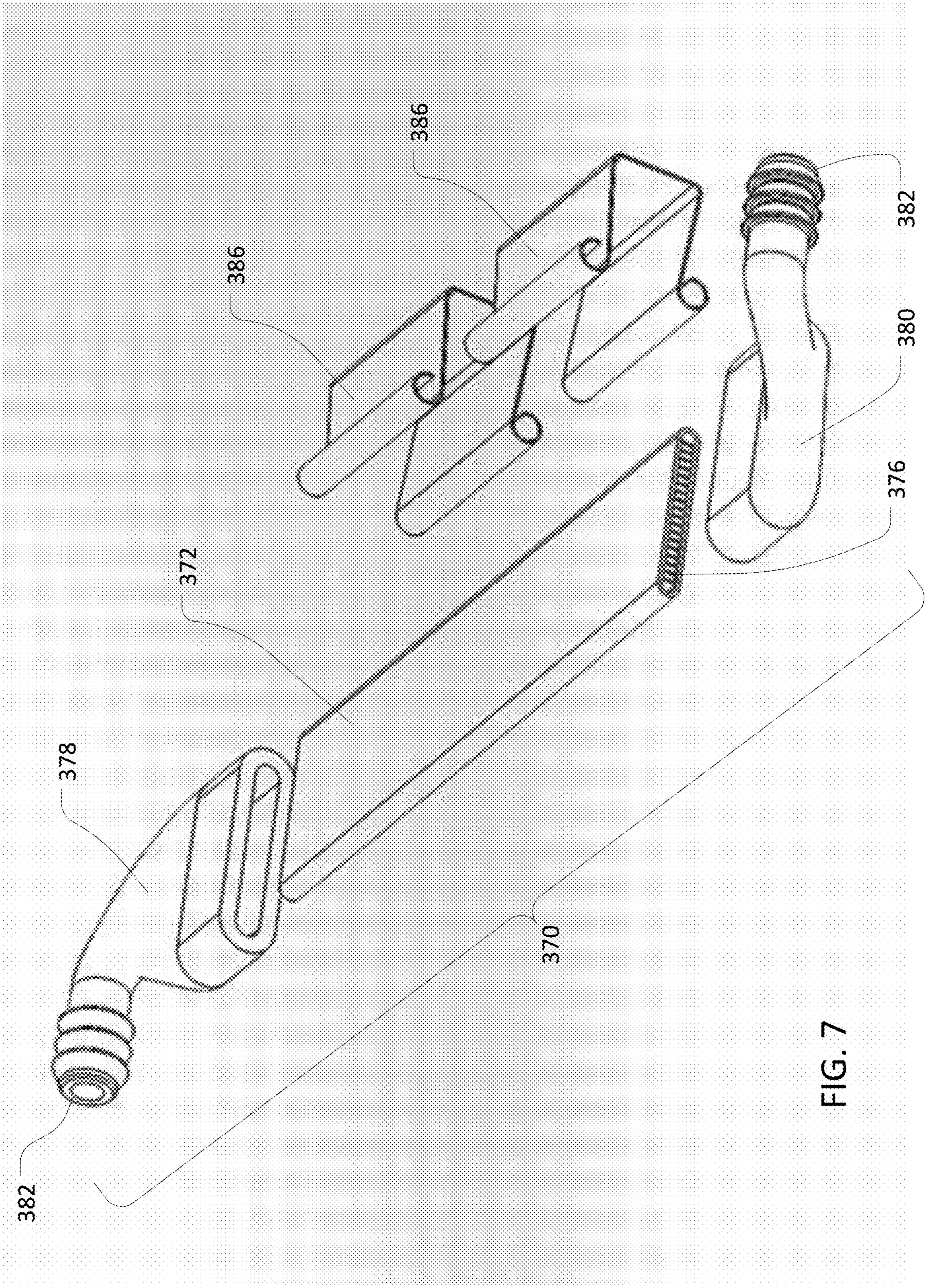
FIG. 7 is an exploded perspective view of components of a branch of the heating system of FIG. 6.

As shown in the exploded view of FIG. 7, the heat sink 372 may be a substantially flat plate-like component having multiple channels 376 (e.g., 19 channels) extending longitudinally through it for carrying the intermediate fluid. At each end of the heat sink 372 is an adapter 378, 380 to transition the fluid flow between the flat shape of the heat sink 372 and a cylindrical connection 382. The connection 382 of the upstream adapter 378 may be connected to a tube (not shown) connected to an outlet 384 in communication with the high pressure outlet of the pump 351. For example, the outlet 384 may communicate with the pump outlet pipe 56 shown in FIG. 1. The connection 382 of the downstream adapter 380 may be connected to a tube (not shown) extending to an inlet (not shown) communicating with the low pressure inlet end of the pump 351. In order to increase the efficiency of the thermal contact between the triacs 374 and the heat sink 372, thermal grease may be positioned at the interface between each triac 374 and the heat sink 372. Additionally, flexible clips 386 may apply a compressive force to keep the triacs 374 and heat sink 372 in tight contact.

Figure 8:
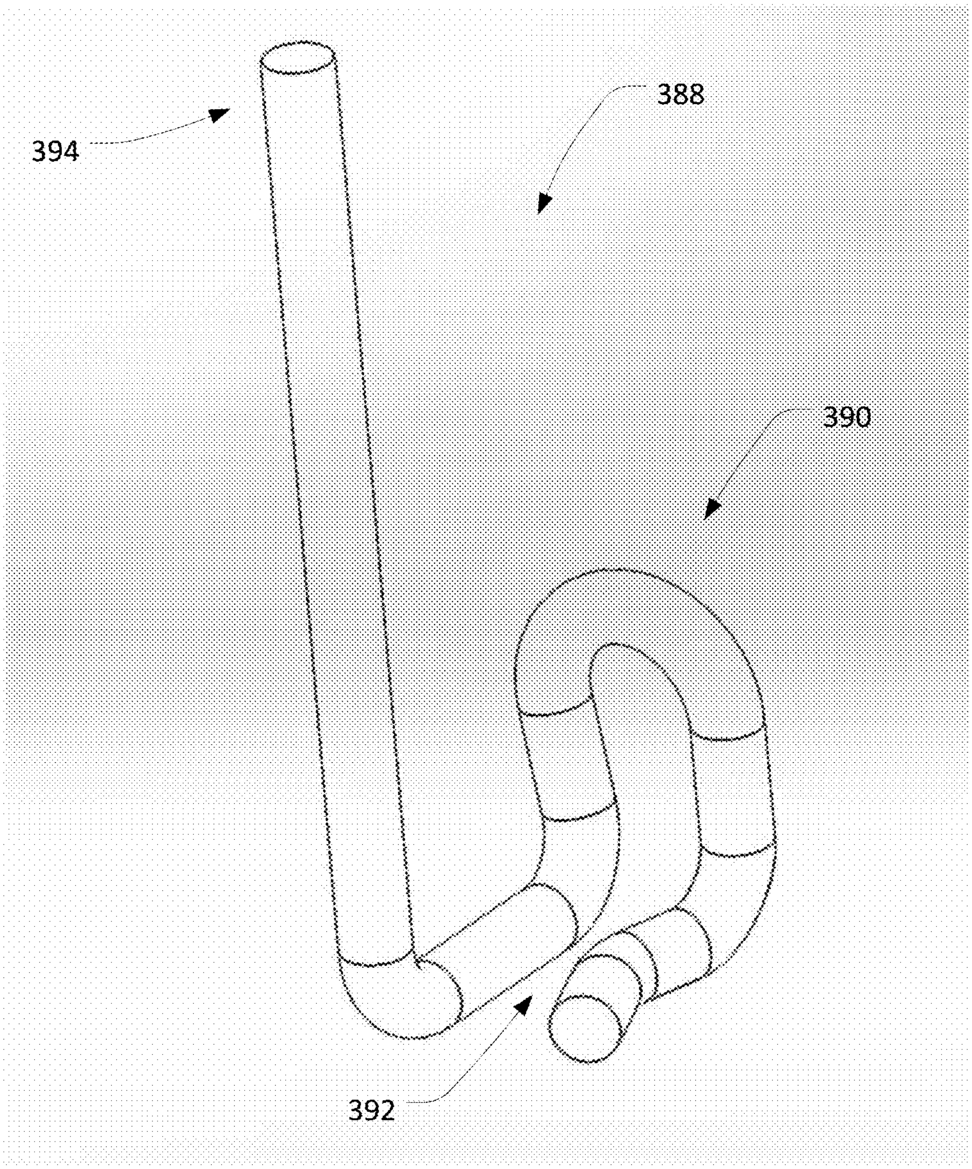
FIG. 8 is a perspective view of a wireform for contacting electrodes according to any of the embodiments of the invention.

In any of the embodiments of the heating system, a wireform like that shown in FIG. 8 may be used to simplify manufacture, lower production cost, and simplify sealing of the components. Specifically, each wire 388 that provides an electrical connection to a respective one of the flat, plate-like electrodes 42, 44, 46 and 48 may have an end bent into the shape of a clip 390 by having two opposed portions of the wire defining a gap 392 therebetween. That gap 392 is sized so that the edge of one of the plate-like electrodes can be slid into the clip 390 and the contact between the wire 388 and the electrode creates an electrical connection between the two components. Beneficially, such design may ease manufacture of the heating system, as it allows the electrodes to be assembled into the system later, where they can be easily electrically connected to the respective wires 388. The terminal end 394 of the wire 388, opposite the end having the clip 390, extends through an opening in the casing 312, which opening is sealed by an o-ring (not shown). After the wire 388 is positioned in the casing 312, the cavity (not shown) in the casing 312 that the wire 388 extends may also be filled with a sealant. As shown in FIG. 7, the terminal ends 394 of the wires 388 may project out of the casing 312, where they may easily be connected to a poke-home connector (not shown) coupled to the electrical circuit 364, which may be or include a printed circuit board.

A heating system as discussed herein can be used in devices other than a dishwasher. For example, the heater can be used in other washing applications such as a clothes washer. In any washing appliance, air can be passed through the target fluid flow path of the heating system so that the intermediate liquid heats the air to facilitate drying of the items in the wash chamber. The heating system can be used in other applications where water is the target fluid, such as in a temperature control system for a battery (e.g., a battery in an electric vehicle). Since electric vehicle batteries do not provide as much power and also have difficulty being charged when at low temperatures (such as winter temperatures in northern climates), the heating system may be utilized to supply heat to the battery. Thus, in that application, the target fluid of the heating system may be a heat exchange fluid in thermal communication with the vehicle batteries. For example, such heat exchange fluid may be a mixture of water and ethylene glycol. Another application of the heating system disclosed herein is as a water heater for pools, spas, or hot tubs. As mentioned above, the heating system can heat any target fluid regardless of whether the target fluid is electrically conductive, and regardless of whether the target fluid is a liquid, a gas, or a multi-phase fluid such as a slurry.

As noted above, the disclosed heating system may be used to heat water in a beverage dispensing device. In one example of use in that context, the volume of the intermediate liquid circulation path may be about 250 $cm^3$, and thus the mass of the intermediate liquid may be about 0.25 kg. In that example, the thermal mass of the intermediate liquid would be 1050 Joules/° C. Therefore, utilizing an ohmic heater with a maximum heating rate of 1500 Watts (i.e., 1500 Joules/sec), the adiabatic intermediate liquid heating rate would be about 1.4° C./sec, and the ratio of the maximum heating rate of the ohmic heater to the volume of the intermediate liquid circulation path would be about 6 Watts/$cm^3$. Although, as discussed above, it is generally desirable that the thermal mass of the intermediate liquid be small in comparison to the thermal mass of the target liquid to be heated, that ratio in an application such as the beverage dispensing application may not be nearly as small as that in the dishwasher application discussed above, since the volume of water dispensed in a cup of coffee, for example, may be quite small (e.g., 150 $cm^3$). Thus, with a volume of the intermediate liquid circulation path being about 250 $cm^3$, the ratio of thermal mass of the intermediate liquid to thermal mass of the target fluid may be about 1.7. However, in that beverage context, where multiple small volumes of liquid may need to be dispensed in relatively quick succession, the larger ratio of thermal mass of the intermediate liquid to thermal mass of the target fluid may help reduce the heat-up time for those successive pours.

As discussed above, the use of an ohmic heater provides important advantages in the invention. However, in some circumstances other types of heaters can be used to heat the intermediate liquid while retaining at least some of the benefits of the invention. For example, an electrical resistance heater can be used to heat the intermediate liquid. Because the intermediate liquid is not consumed during operation of the heater, the intermediate liquid can be selected to minimize the drawbacks of resistance heaters discussed above. For example, the intermediate liquid may be a liquid with a boiling temperature far above the maximum bulk temperature of the intermediate liquid expected in service, so as to allow high local temperatures at the surface of the resistance heater without localized boiling.

As these and other variations and combinations of the features discussed above can be used without departing from the present invention, the foregoing description should be taken as illustrating, rather than limiting, the present invention.

The invention claimed is:

1. A heating system for heating a target fluid comprising:

(a) a structure defining an intermediate liquid circulation path for holding an intermediate liquid and a target fluid flow path for conveying the target fluid, the target fluid flow path being separate from the intermediate liquid circulation path, the intermediate liquid circulation path including a heat exchange portion, the target fluid flow path including a heat exchange portion, the heat exchange portions being in thermal communication with one another and cooperatively constituting a heat exchanger, wherein the intermediate liquid circulation path includes a branch configured to convey at least some of the intermediate liquid into thermal communication with a heat sink coupled to at least one component of an electrical circuit of the heating system;

(b) a pump in the intermediate liquid circulation path for circulating intermediate liquid in the circulation path; and (c) a heater adapted to heat the intermediate liquid, the heater having a maximum heat output, a ratio of the maximum heat output of the heater to a volume of the intermediate liquid circulation path being at least about 5 Watts/cm$^3$.

2. A heating system as claimed in claim 1, wherein the heater is an ohmic heater including a plurality of electrodes disposed within the intermediate liquid circulation path and an electrical circuit arranged to apply different electrical potentials to different ones of the electrodes so that an electrical current passes through the intermediate liquid.

3. A heating system as claimed in claim 1, wherein a volume of the exchange portion of the target fluid path is less than the volume of the intermediate liquid circulation path.

4. A heating system as claimed in claim 1, further comprising the intermediate liquid disposed in the intermediate liquid circulation path.

5. A heating system as claimed in claim 4, wherein the intermediate liquid circulation path is sealed.

6. A method of making a plurality of heating systems as claimed in claim 4, comprising the steps of (i) making a plurality of substantially identical heating systems without the intermediate liquid;

(ii) filling the intermediate liquid circulation paths of a first group of the heating systems with a first intermediate liquid having a first electrical conductivity; and (iii) filling the intermediate liquid circulation paths of a second group of the heating systems with a second intermediate liquid having a second electrical conductivity lower than the first electrical conductivity, whereby the heating systems of the first and second groups are adapted for use with different electrical supply voltages.

7. A heating system as claimed in claim 1, wherein the heat exchange portions include a shell and one or more tubes extending through the shell.

8. A heating system as claimed in claim 7, wherein the heat exchange portion of the intermediate liquid circulation path includes the shell and the heat exchange portion of the target fluid flow path includes the one or more tubes.

9. A heating system as claimed in claim 1, wherein the structure defining the intermediate liquid circulation path includes a flexible membrane to allow for expansion of the volume of the intermediate liquid.

10. A heating system as claimed in claim 9, wherein a spring applies pressure to the flexible membrane to pressurize the intermediate liquid, the spring being configured so that the applied pressure corresponds to the saturation curve of the intermediate liquid.

11. A heating system for heating a target fluid comprising:

(a) a structure defining an intermediate liquid circulation path for holding an intermediate liquid and a target fluid flow path for conveying the target fluid, the target fluid flow path being separate from the intermediate liquid circulation path, the intermediate liquid circulation path including a heat exchange portion, the target fluid flow path including a heat exchange portion, the heat exchange portions being in thermal communication with one another and cooperatively constituting a heat exchanger, wherein the structure defining the intermediate liquid circulation path includes a flexible membrane configured to allow for expansion of the volume of the intermediate liquid;

(b) a pump in the intermediate liquid circulation path for circulating intermediate liquid in the circulation path; and (c) a heater adapted to heat the intermediate liquid, the heater having a maximum heat output, a ratio of the maximum heat output of the heater to a volume of the intermediate liquid circulation path being at least about 5 Watts/cm$^3$.

12. A heating system as claimed in claim 11, wherein the heater is an ohmic heater including a plurality of electrodes disposed within the intermediate liquid circulation path and an electrical circuit arranged to apply different electrical potentials to different ones of the electrodes so that an electrical current passes through the intermediate liquid.

13. A heating system as claimed in claim 11, wherein a volume of the exchange portion of the target fluid path is less than the volume of the intermediate liquid circulation path.

14. A heating system as claimed in claim 11, further comprising the intermediate liquid disposed in the intermediate liquid circulation path.

15. A heating system as claimed in claim 14, wherein the intermediate liquid circulation path is sealed.

16. A method of making a plurality of heating systems as claimed in claim 14, comprising the steps of (i) making a plurality of substantially identical heating systems without the intermediate liquid;

(ii) filling the intermediate liquid circulation paths of a first group of the heating systems with a first intermediate liquid having a first electrical conductivity; and (iii) filling the intermediate liquid circulation paths of a second group of the heating systems with a second intermediate liquid having a second electrical conductivity lower than the first electrical conductivity, whereby the heating systems of the first and second groups are adapted for use with different electrical supply voltages.

17. A heating system as claimed in claim 11, wherein the heat exchange portions include a shell and one or more tubes extending through the shell.

18. A heating system as claimed in claim 17, wherein the heat exchange portion of the intermediate liquid circulation path includes the shell and the heat exchange portion of the target fluid flow path includes the one or more tubes.

19. A heating system as claimed in claim 11, wherein the intermediate liquid circulation path includes a branch in thermal communication with a heat sink coupled to at least one component of an electrical circuit of the heating system.

20. A heating system as claimed in claim 11, wherein a spring applies pressure to the flexible membrane to pressurize the intermediate liquid, the spring being configured so that the applied pressure corresponds to the saturation curve of the intermediate liquid.

* * * * *